United States Patent [19]

Blount

[11] Patent Number: 5,110,840

[45] Date of Patent: May 5, 1992

[54] FLAME-RETARDANT POLYURETHANE FOAM UTILIZING A PHOSPHORUS ACID

[76] Inventor: David H. Blount, 6728 Del Cerro Blvd., San Diego, Calif. 92120

[21] Appl. No.: 459,474

[22] Filed: Jan. 2, 1990

[51] Int. Cl.⁵ .................. C08J 9/04; C08G 18/24; C09K 21/04
[52] U.S. Cl. ........................ 521/85; 521/106; 521/123; 521/126; 521/127; 521/155; 521/159; 252/609
[58] Field of Search ................ 521/85, 106, 123, 126, 521/127, 155, 159; 252/609

[56] References Cited

U.S. PATENT DOCUMENTS

| | | | |
|---|---|---|---|
| 4,291,129 | 9/1981 | Kennedy | 521/103 |
| 4,317,752 | 3/1982 | Blount | 521/159 |
| 4,374,207 | 2/1983 | Stone et al. | 521/123 |
| 4,755,547 | 7/1988 | Pawloski | 521/85 |
| 4,831,062 | 5/1989 | Von Bonin | 521/103 |

Primary Examiner—John Kight, III
Assistant Examiner—John M. Cooney, Jr.

[57] ABSTRACT

Flame-retardant polyurethane foam is produced by mixing and reacting a polyol, a phosphorus acid and a compound containing two or more isocyanate radicals. The flame-retardant polyurethane foam may be used for cushioning, sound and thermal insulation, coating agent, molding agent, or as a cavity filler.

23 Claims, No Drawings

FLAME-RETARDANT POLYURETHANE FOAM UTILIZING A PHOSPHORUS ACID

This invention relates to a process for the production of flame-retardant polyurethane foamed products by mixing and reacting a polyol and a phosphorus acid to produce a polyol dihydrogen phosphate and/or a polyol hydrogen phosphate compound then reacting these compounds with a polyisocyanate to produce a foamed products.

The production of polyurethane products are well known in the Arts and many types of flame-retardant chemicals have been used in the process. In U.S. Pat. Nos. 4,743,624 and 4,778,844 an acid phosphorus compound is utilized but this compound is reacted with a basic salt forming compound in a polyol whereas this invention reacts the polyol with a phosphorus acid and does not utilize a basic salt forming compound. In the novel process of this invention, only a small amount of a phosphorus acid compound is needed. The phosphorus acid compound does prolong the initial curing time in some of the foams but the complete curing time is not greatly effected. The flexible foam produced from triols and tolylene diisocyanate are effected the most. The prolonged curing in flexible foams may be shortened by utilizing a mixture of polymeric MDI with the tolylene diisocyanate or by reacting the free acid radicals with an organic compound that will react with the free phosphorus acid radicals such as epoxy compound, alcohols, aldehydes, thioalcohols, organic acids, ketones, organic anhydrides, organic isocyanates, organic thiocyanate and mixtures thereof.

In the production of rigid foams there is some discoloration in the center of the foam but this also can be eliminated by using a mixture of polyols, adding organic compounds, adding boric acid, mixing various polyisocyanates and by other methods.

Acidic boron compound also may be used with the phosphorus acid to produce flame-retardant foam thereby reducing the amount of phosphorus acid needed and at the same time reduce the discoloration produced in the rigid foams. Any suitable acidic boron compound may be used such as orthoboric acid, metaboric acid, tetraboric acid, boric oxide plus water, boron halides plus water and mixtures thereof. Boric acid powder is the preferred acidic boron compound.

DETAILED DESCRIPTION

The flame-retardant polyurethane foamed products may be produced by admixing and reacting the following components:

A) phosphorus acid compound, 1 to 25 parts by weight;

B) organic polyhydroxyl compound (polyol) 20 to 200 parts by weight;

C) organic compound containing 2 or more isocyanate radicals, 25 to 100 parts by weight;

D) organic compound, except organic salt-forming compounds, which will react with phosphorus acid compounds and/or isocyanate radicals up to 25 parts by weight.

COMPONENT A

Any suitable phosphorus acid compound that will react with a polyol may be used in this invention. Suitable phosphorus acid compounds include, but are not limited to, oxygen acids of phosphorus such as phosphoric acid, phosphinic acid, phosphenous acid, hypophosphorous acid, orthophosphoric acid, pyrophosphoric acid, triphosphoric acid, metaphosphoric acid, and mixtures thereof. Phosphoric acid is the preferred phosphorus acid compound. The phosphoric acid may contain up to 30% water.

COMPONENT B

Any suitable compound that contains at least one active hydrogen, preferably 2 or more active hydrogen-containing compounds, that will react with isocyanate radical may be used in this invention.

The organic compounds having reactive hydrogens are understood to be not only compounds which contain amino groups, thiol groups or carboxyl groups, but particularly also polyhydroxyl compounds.

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterphthalate and bisglycol terephthalate. Any suitable polyhydric alcohol may be used such as, for example, ethylene glycol; propylene-1-2 and -1,3-glycol; butylene-1,4- and -2,3-glycol; propylene-1,2- and -1,3-glycol; butylene-1,4- and -2,3-glycol; hexane-1,6-diol; octane-1,8-diol; neopentyl glycol; cyclohexanedimethenol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as -caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of BF$_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

Any suitable compound which contains one or more active hydrogens may be used in this invention such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae: RSH, $RCH_2CL$, $RCH_2Br$, $RCH_2I$, $RCN$, $RNO_2$, $RCOCL$, $RCOBr$, $RSO_2CL$, $RCOOH$, $RS_3OH$, $RCOO^-$, $RSO_3^-$, ROR,

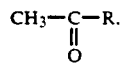

wherein R denotes a methyl, ethyl or propyl group, may be used in this invention.

Any suitable epoxy compound may be used in this invention. Suitable epoxy compounds include but are not limited to ethylene oxide, propyleneoxide, butylene oxide, tetrahydrofuran, styrene oxide, epihalohydrins and polyepoxy compounds. Polyepoxy compounds are preferred, but not limited to, a list of suitable polyepoxy compounds is found in U.S. Pat. No. 4,292,413 page 2–4 and is incorporated into this application. The polyepoxy compounds are well known in the Arts and are the preferred epoxy compound.

COMPONENT C

Any suitable organic compound containing at least 2 isocyanate radicals may be used in this invention. Suitable organic polyisocyanates may be aliphatic, cycloaliphatic, araliphatic, aromatic and heterocyclic polyisocyanates are well known in the arts. Suitable polyisocyanates which may be employed in the process of the invention are exemplified by the organic diisocyanate which are compounds of the general formula:

wherein R is a divalent organic radical such as an alkylene, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6 diisocyanates and any mixtures of these isomers ("TDI"), Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this Invention. The unsaturated oliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule. The double-bond vinyl radical may be cured with free-radical initiators such as an organic hydroperoxide. The isocyanate radical may be cured and foamed with a compound containing attached water.

COMPONENT D

Optionally, any suitable organic compound, with the exception of organic salt-forming compounds that will react with free phosphorus acid radicals and/or isocyanate radicals may be utilized in this invention. Suitable organic compounds include, but are not limited to epoxy compounds, alcohols, aldehydes, ketones, phenols, thioalcohols, organic acids, isocyanates, thioisocyanates, thiophenols, carboxylic acid halides, sulphonic acid halides, organic esters, organic ethers and thioethers, halomethyl compounds, nitriles, organic microcompounds, polyepoxy compounds and mixtures thereof. When these organic compounds are used in the reaction mixture, 1 to 25 parts by weight is used. This compound may be saturated, unsaturated and contain a substituted radical, e.g. halogen, etc.

Compounds containing organic amphophilous compounds, preferably contain 1 to 9 carbon atoms and has a molecular weight of from 32 to about 400, which contain one DH group and/or at least one other hydrophilic and/or polar group. The other hydrophilic and/or polar group is preferably a functional group corresponding to one of the following general formulae: $RSH$, $RCH_2Cl$, $RCH_2Br$, $RCH_2I$, $RCN$, $RCOCL$, $RCOBr$, $RSO_2Cl$, $RCOOH$, $RSO_3H$, $RCOO—$, $RSO_3$, $ROR$,

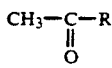

wherein R denotes a methyl, ethyl or propyl group. The organic amphilphilous compounds may contain an OH group and/or from 1 to 6 of these other groups. Examples of these compounds may be found in U.S. Pat. No. 4,153,764, column 6 and 7 and is incorporated into this application.

Suitable epoxy compounds include, but are not limited to ethylene oxide, propylene oxide, butylene oxide, tetrahydrofuran, styrene oxide, epihalohydrins, trichlorobutylene oxide, etc. A list of suitable polyepoxy compounds is found in U.S. Pat. No. 4,292,413 page 24 and is incorporated into this application.

The flame-retardant polyurethane products may be produced under any suitable physical conditions. The components may be mixed in any suitable physical condition. The components may be mixed in any suitable manner. It is preferable to mix and react components A and B first, then optionally, component D to produce a polyol dihydrogen phosphate and/or polyol hydrogen phosphate compound (flame-retardant polyol) then mix and react it with a polyisocyanate compound. The components may be reacted at any suitable temperature, usually between ambient temperature to 160° C. Increased temperature usually increase the reaction speed. Ambient pressure is usually utilized but when one of the reactants is a gas, increased pressure is used. The flame-retardant polyol is usually produced within ½ to 24 hours. The components A, B and C may be mixed simultaneously to produce flame-retardant polyurethane foam with or without component D, urethane catalysts or blowing agents. It is preferred to mix the polyol, phosphorus acid and optional additives first and use as Component B and then mix Component B with organic polyisocyanate (Component A) to produce a foamed product.

Other optional components may be used such as water, initiators, fillers, diluents, blowing agents, emulsifying agents, activators, foam stabilizers, modifying compounds, unsaturated polymerizable compound with free-radical initiator, flame-retardant compounds, pigments, dyes, stabilizers against aging and weathering, plasticizers, fungicidal and bacteriocidal substances, etc.

The proportions of the reactants and other compounds used in this invention may vary within the following ratios;

a) 1 to 25 parts by weight of component A (phosphorus acid compound);

b) 20 to 200 parts by weight of component B (polyol);

c) 25 to 100 parts by weight of a polyisocyanate;

d) up to 25 parts by weight of an organic compound that will react with a phosphorus acid compound;

e) up to 50% by weight of an inert liquid, boiling in the range of −25° C. to 80° C.;

f) up to 20% by weight of foam stabilizer;

g) up to 10% by weight of polyurethane catalyst h) up to 20% by weight of emulsifying agent i) up to 300% by weight of inorganic or organic particulate or pulverulent material;

j) up to 300 parts by weight of a modifying compound;

k) up to 25% by weight of phase-change material;

l) up to 5% by weight of a free-radical-initiator;

m) up to 10% by weight of water;

n) up to 25% by weight of an organic polymerizable compound o) up to 20% by weight of an acid boron compound. percentage based on weight of the reaction mixture.

When producing foams by the process according to the invention, blowing agents may be used, even when using NCO-prepolymers which give rise to the evolution of carbon dioxide. The blowing agents which are suitable for this purpose are inert liquids boiling within a range of −25° C. to +80° C. and preferably −15° C. to +40° C. They are used in quantities of 0–50 percent by weight, preferably 2–30 percent by weight when needed, based on the reaction mixture.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 455 and 507 to 510.

Catalysts which promote the reaction of isocyanates with reactive hydrogen are also often used according to the invention in catalytic amounts. Catalysts known per se may be used, e.g., tertiary amines such as triethylamine, tributylamine, N-methyl-morpho-line, N-ethylmorphonine, N-cocomorpholine, N,N,N',N'-tetramethylethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-dimethyl cyclohexylamine, N,N,N',N'-tetramethyl-1,3-butane diamine, N,N-dimethyl-B-phenyl ethylamine, 1,2-dimethyl imidazole or 2-methyl imidazole.

Any suitable organo-metal compound which will act as a urethane catalyst may be used in this invention, such as cadmium, antimony, tin, cobalt, zinc, titanium, particularly organic tin compounds, etc. and mixtures thereof. Organotin-sulfur compounds may also be used.

The organic tin compounds used are preferably tin-(II) salts of carboxylic acids such as tin(II)-acetate, tin(II)-octoate, tin(II)-ethyl hexoate and tin(II)-laureate and the dialkyl tin salts of carboxylic acids such as dibutyl tin diacetate, dibutyl tin dilaurate, dibutyl tin maleate or dioctyl tin diacetate.

Suitable tertiary amine catalysts with hydrogen atoms which are reactive with isocyanate groups include, e.g., triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The polyurethane catalysts or activators are generally used in any catalytic amount, preferably in a quantity up to 10 percent by weight, based on the reactive mixture.

A surface-active additive (emulsifiers and foam stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acid with amines, e.g., oleic acid diethylamine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in a polyol, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photo-polymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5-12 and is incorporated into this Application.

Any suitable modifying or additive compound may be used in the reaction of this invention to vary properties of the product. Typical modifying compounds include polyepoxides, polysulfides, polymers, alkali sulfides, aminoplasts, phenoplasts, fatty or rosin acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc. and mixtures thereof.

Any suitable phase-change materials may be added to the components of this invention. Phase-change materials are materials that melt to store heat and freeze (solidify) to give up heat. The melting and freezing of the material takes place over a narrow temperature range, similar to ice. Heat is stored during the day and released at night when temperature drops. Suitable phase-change materials include, but are not limited to, salt hydrates, crystalline alkyl hydrocarbons (paraffin waxes), fatty acids, fatty acid esters, poly(ethylene glycol) wax and mixtures thereof. Flame retardants may be added to change the melting and freezing points. The various phase-change materials may be mixed to obtain the desired melting and freezing points.

Any suitable flame-retardant agent may be used in this invention such as alkali metal phosphate compounds, alkaline metal earth phosphate compounds, ammonium phosphates and other salts of phosphoric acid, halogenated paraffins, organic phosphorus containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113.

Polyurethane products have many uses and these uses are well known in the Arts. The polyurethane foam produced by this invention may be used for cushioning, packaging, sound and thermal insulation, as an adhesive, as construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The object of the present invention is to provide a novel process of producing flame-retardant polyurethane products. Another object is to produce novel flame-retardant polyurethane products. Another object is to produce novel flame-retardant polyurethane products using small amounts of low-cost flame-retardant agents. Still another object is to produce flame-retardant polyurethane products that may be used for thermal insulation, structural purposes, sound proofing, shock-resistant packaging, cushions, surface coating, adhesives, casting material, putty, etc.

DESCRIPTION OF PREFERRED EMBODIMENTS

My invention will be illustrated in greater detail by the specific examples which follow, it being understood that these preferred embodiments are illustrative of, but not limited to, procedures which may be used in the production of flame-retardant polyurethane products. Parts and percentages are by weight unless otherwise indicated.

EXAMPLE 1

About 10 parts by weight of phosphoric acid containing 25% by weight of water, 90 parts by weight of polypropylene, a triol, 3,000 mol. wt., hydroxyl no. 56, 1 part by weight of a foam stabilizer (L5420 by Union Carbide) and 50 parts by weight of tolylene diisocyanate (TDI 80 by MOBAY) are mixed at ambient pressure and temperature. The mixture expands to about 1.5 lb./ct. ft. then solidifies thereby producing a flame-retardant polyurethane foam. The foam cured in 3 to 4 days into a flexible foam with good strength.

This foam was flame tested after 1 week by using a propane flame of ⅛ inch in length at about 1 inch from the foam. The flame remained on the foam for 15 seconds and the foam melted but the melted material did not burn. The flame went out when the torch was removed.

EXAMPLE 2

Example 1 is modified wherein 0.25 parts by weight of tin octoate is added to the polyol.

Example 1 is modified wherein 5 parts by weight of an organic compound selected from the list below is added to the polyol.
a) propylene oxide
b) ethylene glycol
c) propylene glycol
d) diethylene glycol
e) aqueous formaldehyde
f) benzaldehyde
g) epichlorohydrin
h) furfuryl alcohol
i) furfuraldehyde
j) tetrahydrofuran oxide
k) benzoic acid
l) adipic acid
m) aminobenzoic acid
n) phenol
o) fumaric acid
p) sulfosalicyclic acid
q) succinic anhydride
r) maleic anhydride
s) ethylene chlorohydrin
t) glycolic acid
u) propionic acid chloride
v) ethanol
w) acetaldehyde
x) benzenesulphonic acid chloride
y) ethyl acetate
z) mixtures of the above

EXAMPLE 3

Example 1 is modified wherein another triol is used in place of the polypropylene polyol and selected from the list below:
a) polypropylene triol mol. wt. 3,500, hydroxyl no. 49;
b) poly (oxyalkylene) triol, mol. wt. 3,000 hydroxyl no. 58;
c) poly (oxyalkylene) triol, mol. wt. 3,500, hydroxyl no. 49;
d) poly (oxyalkylene) triol, mol. wt. 4,800, hydroxyl no. 35;
e) polypropylene diol, mol. wt. 1,275, hydroxyl no. 88;
f) polypropylene diol, mol. wt. 2,000, hydroxyl no. 56.

EXAMPLE 5

Example 1 is modified wherein different amounts of phosphoric acid are used and selected from the list below:
a) 5 parts by weight
b) 15 parts by weight
c) 20 parts by weight

EXAMPLE 6

Example 1 is modified wherein in the percentage amounts of water in the phosphoric acid is varied and selected from the list below:
a) 20 percent
b) 15 percent
c) 12 percent
d) 10 percent
e) 5 percent
f) 1 percent

EXAMPLE 7

Example 1 is modified wherein the phosphoric acid and the triol is first heated to 70° C. to 90° C. for about 30 minutes thereby producing a mixture of polyol dihydrogen phosphate and dipolyol hydrogen phosphate.

EXAMPLE 8

Example 1 is modified wherein the phosphoric acid is first mixed with the polyol at ambient temperature and reacted for 24 hours thereby producing polyol dihydrogen phosphate compound.

EXAMPLE 9

Example 1 is modified wherein the 50 parts by weight of tolylene diisocyanate is replaced with 75 parts by weight of polymeric MDI (MONDUR MR by MOBAY).

EXAMPLE 10

Example 1 is modified wherein 50 percent of the phosphoric acid is replaced with boric acid.

EXAMPLE 11

About 30 parts by weight of sucrose polyether polyol, hydroxyl no. 380, 3 parts by weight of phosphoric acid containing 10 percent water, 0.3 parts by weight of a foam stabilizer (L5420 by Union Carbide) and 30 parts by weight of polymeric MDI (MONDUR MR by MOBAY) are mixed. The mixture slowly expands to about 2.5 lbs./cu. ft. and solidifies to produce a closed cell rigid flame-retardant foam.

The foam was flame tested after 1 week by using a ½ inch propane torch flame. The flame was held about 1 inch from the foam for 15 seconds. The superficial layer of the foam slowly burned and formed a char and as soon as the char formed the flame went out. The charred area could be further heated and would not burn.

EXAMPLE 12

Example 11 is modified wherein different amounts of phosphoric acid is used and selected from the list below:
a) 1 part by weight
b) 2 parts by weight
c) 4 parts by weight
d) 5 parts by weight

EXAMPLE 13

Example 11 is modified wherein 2 parts by weight of boric acid are added with the phosphoric acid.

EXAMPLE 14

Example 1 is modified wherein 0.2 parts by weight of an amine polyurethane catalyst (DABCO R8020 by Air Products) and 0.1 part by weight of an organic-tin catalyst (DABCO T12 by Air Products) are added to the polyol.

EXAMPLE 15

Example 11 is modified wherein the polyol is replaced with a polyol selected from the list below:
a) polyester polyol, hydroxyl no. 275;
b) sucrose amine polyol, hydroxyl no. 350;
c) phenyl amine polyol, hydroxyl no. 380;
d) poly (oxyalkylene) polyol;
e) aromatic polyester polyol, hydroxyl no. 405
f) chlorinated polyhydroxypolyether, hydroxyl no. 193;
g) methyl glycoside-based polyol, hydroxyl no. 240;
h) phenol-formaldehyde resin, hydroxyl no. 140;
i) aromatic polyol, hydroxyl no. 375;
j) sorbitol-based polyol, hydroxyl no. 490;
k) polypropylene polyol, hydroxyl no. 380;
l) phosphorus-containing polyol (VIROL-82 by MOBII), hydroxyl no. 205;
m) mixtures of the above.

EXAMPLE 16

Example 11 is modified wherein 30 percent of the polyol is replaced with a triol selected from the group found in Example 4.

EXAMPLE 17

Example 11 is modified wherein 1 part by weight of an organic compound selected from the list found in Example 3.

EXAMPLE 18

Example 11 is modified wherein 5 parts by weight of a blowing agent, trichlorofluoromethane, is added to the mixture.

EXAMPLE 19

Example 11 is modified wherein various amounts of water is found in the phosphoric acid and selected from the list below:
a) 1 percent
b) 3 percent
c) 5 percent
d) 7 percent
e) 12 percent
f) 15 percent
g) 20 percent
h) 25 percent

EXAMPLE 20

Example 1 is modified wherein another phosphorous acid is used in place of phosphoric acid and selected from the list below:
a) phosphinic acid
b) phosphinous acid
c) hypophosphorous acid
d) orthophosphoric acid e) pyrophosphoric acid
f) triphosphoric acid
g) mixtures thereof.

EXAMPLE 21

Example 11 is modified wherein another phosphorus acid is used in place of phosphoric acid and selected from the list found in Example 20.

EXAMPLE 22

Example 11 is modified wherein 3 parts by weight of a phase-change material, a mixture of paraffin waxes with a freezing (solidifying) point of about 70° F. and a melting point of about 72° F., is added in a liquid form and emulsified with the polyol.

EXAMPLE 23

Example 1 is modified wherein the tolylene diisocyanate is first reacted with 1 part by weight of propylene glycol thereby producing a tolylene diisocyanate prepolymer and used in place of the tolylene diisocyanate.

EXAMPLE 24

Example 11 is modified wherein another polyisocyanate is used in place of the polymeric MDI and selected from the list below:
a) Polymeric MID (PAPI 27 by DOW)
b) modified polyisocyanate (MONDUR T-422 by MOBAY)
c) methylene diphenyl isocyanate
d) hexamethylene-1,6-diisocyanate
e) sulphonated diisocyanatodiphenylmethane

EXAMPLE 25

Tolylene diisocyanate is reacted with hydroxyethyl methacrylate to produce a NCO-terminated prepolymer, then 30 parts by weight of the prepolymer is mixed with 6 parts by weight of phosphoric acid containing 5 percent water, 0.2 parts by weight of triethylamine, 0.1 parts by weight of tin octoate and a catalytic amount of organic hydroperoxide. The mixture cures into a flame-retardant microcellular foam.

EXAMPLE 26

About 30 parts by weight of a polylepoxy resin (glycidyl ether of dihydric phenol), 1 part by weight of ethylene glycol, 0.3 parts by weight of foam stabilizer (L5420 by Union Carbide), 0.5 parts by weight of an amine urethane catalyst (DABCO R8020 by Air Products), and 0.05 parts by weight of tin octoate are mixed, then 2 parts by weight of phosphoric acid containing 10 percent water and 30 parts by weight of polymeric MDI (PAPI 27 by DOW) are added and mixed. The mixture slowly expands to produce a strong rigid foam of about 2-3 lbs./cu. ft.

EXAMPLE 27

Example 26 is modified wherein the polyepoxy resin is a phenol-formaldehyde resin containing epoxide radicals.

EXAMPLE 28

Example 26 is modified wherein 5 parts by weight of a polypropylene triol (POLY G 32-56 by OLIN) is added with the polyepoxy resin.

EXAMPLE 29

Example 11 is modified wherein 20 parts by weight of a filler selected from the list below is added to the polyol:
a) silica powder
b) fiberglass powdered fibers
c) polystyrene powder
d) nylon powder
e) polyethylene powder
f) polyethylene chloride powder
g) expanded glass
h) sand powdered
i) polycarbonate powder
j) mixtures of the above.

EXAMPLE 30

Example 11 is modified wherein 5 parts by weight of a modifying compound is added and selected from the list below:
a) urea-formaldehyde powder
b) phenol-formaldehyde powder
c) styrene oxide
d) furfural-ketone resin
e) phthalate esters
f) polyester benzoate
g) polyester resin with peroxide catalyst
h) rosin acid
i) mixtures of the above.

EXAMPLE 31

About 20 parts by weight of sucrose polyol, hydroxyl no. 350, 10 parts by weight of polypropylene polyol, hydroxyl no. 380, 3 parts by weight of phosphoric acid containing 5 percent water, 0.5 parts by weight of foam stabilizer (193 by DOW corning) and 0.2 parts by weight of an amine catalyst (DABCO R8020 by AIR PRODUCTS) are mixed then 5 parts by weight of a polymerizable organic compound selected from the list below and containing a catalytic amount of a free-radical initiator are added and mixed then 30 parts by weight of a polymeric MDI (PAPI 27 by DOW) 5 parts by weight of trichlorofluoromethane and 0.1 parts by weight of tin octoate are added and mixed. The mixture expands to produce a rigid flame-retardant foam:
a) styrene
b) methyl methacrylate
c) vinyl acetate
d) isoprene
e) chloroprene
f) unsaturated polyester resin containing 40 percent styrene
g) acrylonitrile
h) vinyl isobutyl ether
i) vinyl methyl ether
j) vinyl pyrrolidone
k) vinylidene chloride
l) triallyl cyanurate
m) divinyl benzene
n) methyl acrylic acid
o) acrylic acid
p) mixtures thereof.

EXAMPLE 32

50 parts by weight of poly (oxyalkylene) triol, hydroxyl no. 58 and 5 parts by weight of phosphoric acid containing 25 percent water is heated to 80°–90° C. for about 30 minutes thereby producing a mixture of polyol dihydrogen phosphate, dipolyol hydrogen phosphate and triol. To this mixture 5 parts by weight of propylene oxide is added then heated to the boiling point of propylene oxide for 30 minutes thereby producing a mixture of propylene-polyol hydrogen phosphate, polyol dihydrogen phosphate, dipolyol hydrogen phosphate and triol.

EXAMPLE 33

Example 32 is modified wherein the components are mixed at ambient temperature thereby producing a mixture of propylene-polyol hydrogen phosphate, dipropylene polyol phosphate and triol.

EXAMPLE 34

30 parts by weight of mixture produced in Example 32, 0.5 parts by weight of a foam stabilizer (L5420 by Union Carbide), 0.4 parts by weight of water, 0.5 parts by weight of glycolic acid and 15 parts by weight of tolylene diisocyanate (TDI by OLIN) are mixed. The mixture expands to about 1.5-2 lbs./cu. ft. and solidifies into a flexible flame-retardant foam. The foam cures in 1-3 days.

EXAMPLE 35

Example 34 is modified wherein the mixture produced in Example 33 is used in place of the mixture produced in Example 32.

EXAMPLE 36

Example 34 is modified wherein 3 parts by weight of methylene chloride is added to the mixture produced in Example 32.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. The process for the production of flame-retardant polyurethane foam which process consist of mixing and reacting the following components:
   A. phosphorus acid compounds selected from the group consisting of phosphoric acid, phosphinic acid, phosphenous acid, hypophosphorus acid, orthophosphoric acid, pyrophosphoric acid, triphosphoric acid, metaphosphoric acid and mixtures thereof, in the amount of 1 to 25 parts by weight;
   B. organic polyhydroxyl compound, 20 to 200 parts by weight;
   C. organic polyisocyanate, 25 to 100 parts by weight;
   D. organic compound which will react with phosphorus acid compounds, up to 25 parts by weight and selected from the group consisting of alcohols, epoxy compounds, polyepoxy compounds, organic acids, aldehydes, organic esters, ketones, organic anhydrides, thioalcohols, phenols, nitriles, halomethyl compounds, thiophenols, organic isocyanates, sulphonic acids, thioisocyanates, thioethers, organic ethers, sulphonic acid halides, carboxylic acid halides, and mixtures thereof.

2. The product produced by the process of claim 1.

3. The process of claim 1 wherein up to 50 percent by weight of an inert liquid, boiling in the range of −25° C. to 80° C., is included in the reaction mixture as a blowing agent and the reaction proceeds with concomitant foaming.

4. The process of claim 1 wherein up to 10 percent by weight of an amine polyurethane catalyst is included in the reaction mixture.

5. The process of claim 1 wherein up to 10 percent by weight of an organic-metal polyurethane catalyst is included in the reaction mixture.

6. The process of claim 1 wherein up to 20 percent by weight of a foam stabilizer is included in the reaction mixture.

7. The process of claim 1 wherein up to 20 percent by weight of emulsifying agent is included in the reaction mixture.

8. The process of claim 1 wherein an inorganic or organic particulates or pulverulent material is included in the reaction mixture.

9. The process of claim 1 wherein up to 25 percent by weight of phase-change materials that melts to store heat and solidifies to give off heat are added to the reaction mixture.

10. The process of claim 1 wherein up to 10 percent by weight of water is included in the reaction mixture.

11. The process of claim 1 wherein up to 50 percent by weight of an unsaturated polymerable organic compound and a catalytic amount of a free-radical initiator is added to the reaction mixture.

12. The flame-retardant polyurethane foam produced by the process which consist simultaneously mixing and reacting the following components:
   A. phosphoric acid
   B. organic polyhydroxyl compound
   C. organic polyisocyanate in the presence of a foram stabilizer.

13. The flame-retardant polyurethane foam produced by the process which consist simultaneously mixing and reacting the following components:
   A. phosphoric acid
   B. organic polyhydroxyl compound
   C. organic polyisocyanate.
   D. organic compound which will react with phosphorus acid compound, selected from the group consisting of alcohols, epoxy compounds, polyepoxy compounds, aldehydes, ketones, phenols, thioalcohols, organic acids, isocyanates, thioisocyanates, thiophenols, carboxylic acid halides, sulphonic acid halides, organic esters, organic ethers, thioethers, halomethyl compounds, nitriles and mixtures thereof, in the presence of a foam stabilizer and an organic-tin urethane catalyst.

14. The flame-retardant polyurethane foam produced by the process which consist mixing and reacting the following components:
   A. phosphoric acid
   B. organic polyhydroxyl compound
   C. organic polyisocyanate
   D. propylene oxide in the presence of a foam stabilizer.

15. The flame-retardant polyurethane foam produced by the process which consist simultaneously mixing and reacting the following components:

A. phosphoric acid
B. organic polyhydroxyl compound
C. organic polyisocyanate
D. epoxy compound in the presence of a foam stabilizer and an organo-tin urethane catalyst.

16. The process of claim 1 wherein component D is selected from a compound having the following general formulae: RSH, RCH$_2$Cl, RCH$_2$Br, RCH$_2$I, RCN, RCOCl, RCOBr, RSO$_2$Cl, RCOOH, RSO$_3$H, RCOO$^-$, RSO$_3^-$, ROR,

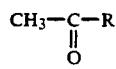

wherein R denotes a methyl, ethyl or propyl group.

17. The flame-retardant polyurethane product produced by the process which consist simultaneously mixing and reacting the following components:
A. phosphorus acid compound, selected from the group consisting of phosphoric acid, phosphinic acid, phosphenous acid, hypophosphoric acid, orthophosphoric acid, pyrophosphoric acid, triphosphoric acid, metaphosphoric acid and mixtures thereof;
B. organic polyhydroxyl compound
C. organic polyisocyanate
D. wherein component A is first reacted with component C then reacted with Component B.

18. The flame-retardant polyurethane product produced by the process which consist mixing and reacting the following components:
A. pyrophosphoric acid
B. organic polyhydroxyl compound
C. organic polyisocyanate
D. epibalohydrin wherein component A is first reacted with component C then reacted with component B and D.

19. The flame-retardant polyurethane product produced by the process which consist simultaneously mixing and reacting the following components:
A. pyrophosphoric acid
B. organic polyhydroxyl compound
C. organic polyisocyanate.

20. The flame-retardant polyurethane product produced in claim 17 wherein an organic compound which will react with phosphorus acid compounds is added with component B and C and selected from the group consisting of epoxy compounds, alcohols, aldehydes, ketones, phenols, thioalcohols, organic acids, isocyanates, thioisocyanates, thiophenols, carboxylic acid halides, sulphonic acid halides, organic esters, organic ethers, thioethers, halomethyl compounds, nitriles, polyepoxy compounds and mixtures thereof.

21. The flame-retardant polyurethane product produced in claim 19 wherein an organic compound which will react with phosphorus acid compounds selected from the group consisting of alcohols, epoxy compounds, aldehydes, ketones, phenols, thioalcohols, organic acids, isocyanates, thioisocyanates, thiophenols, carboxylic acid halides, sulphonic acid halides, organic esters, organic ethers, thioethers, halomethyl compounds, nitriles, polyepoxy compounds and mixtures thereof is added with component C in the presents of a foam stabilizer and an organic-tin urethane catalyst.

22. The flame-retardant polyurethane product produced in claim 15 wherein an organic compound which will react with phosphorus acid compounds and is selected from the group consisting of alcohols, epoxy compounds, polyepoxy compounds, aldehydes, ketones, phenols, thioalcohols, organic esters, organic ethers, organic acids, thioethers, isocyanates, thioisocyanates, thiophenols, carboxylic acid halides, sulphonic acid halides, halomethyl compounds, nitriles, and mixtures thereof is added with components A, B and C.

23. The flame-retardant polyurethane product produced by the process which consist simultaneously mixing and reaction the following components:
A. phosphorus acid compound selected from the group consisting of phosphoric acid, phosphinic acid, phosphenous acid, hypophosphoric acid, orthophosphoric acid, pyrophosphoric acid, triphosphoric acid, metaphosphoric acid and mixtures thereof:
B. organic polyhydroxyl compound
C. organic polyisocyanate
D. propylene oxide.

* * * * *